United States Patent [19]

Geyer

[11] Patent Number: 4,872,761
[45] Date of Patent: Oct. 10, 1989

[54] EXTRUSION APPARATUS

[76] Inventor: Paul Geyer, 15660 Tacoma, Detroit, Mich. 48025

[21] Appl. No.: 194,070

[22] Filed: May 12, 1988

[51] Int. Cl.$^4$ ............................................. B29B 1/06
[52] U.S. Cl. ........................................ 366/79; 366/91; 366/293; 366/318; 425/208; 425/209
[58] Field of Search ........................ 366/14, 15, 66, 96, 366/97, 75, 79, 81, 83–86, 89, 90, 91, 292, 293, 295, 318, 319, 321–324; 425/207–209; 100/117, 145

[56] References Cited

U.S. PATENT DOCUMENTS

| Re. 26,147 | 1/1967 | Parshall et al. | |
|---|---|---|---|
| 1,333,249 | 3/1920 | Fiddyment | |
| 3,271,819 | 9/1966 | Lacher | 366/89 |
| 3,371,379 | 3/1968 | Reifenhauser | 366/79 X |
| 3,746,318 | 7/1973 | Schippers | 366/79 |
| 3,867,079 | 2/1975 | Kim | 366/88 X |
| 3,924,842 | 12/1975 | Klein et al. | 366/79 |
| 4,232,973 | 11/1980 | Ligouzat | 366/293 X |
| 4,290,702 | 9/1981 | Klein et al. | 366/293 X |
| 4,472,059 | 9/1984 | Klein et al. | 366/91 X |
| 4,637,790 | 1/1987 | Klein | 425/208 |
| 4,733,970 | 3/1988 | Yokana | 366/89 X |

Primary Examiner—Timothy F. Simone
Attorney, Agent, or Firm—Dykema Gossett

[57] ABSTRACT

The apparatus is for the mixing and refining of rubber-like materials, either hot or cold feed, and some thermoplastic materials. It comprises an elongated cylindrical barrel member and an elongated rotor member, disposed coaxially in the interior of said barrel member. The rotor member is provided with a concentric bore, at its downstream end in which a stationary screw-like member is coaxially disposed. Means are provided for relative rotational movement of the rotor member, to the barrel member and to the stationary screw-like member in the treating and axial advancement of the process material. With such a construction, the barrel, rotor and screw-like members have a feed end, a forcing zone, a mixing and refining zone, a stationary screw-like member and discharge end, interposed between the ends of the apparatus. The rotor member of the forcing zone is provided with extrusion grooves or groove, capable of warming, pressurizing and transporting the process material to the mixing and refining zone. The rotor groove which is the continuation of the forcing zone groove design is provided with a two part groove design. The leading portion of the groove design consists of a deep, high lead, or longitudinal extrusion groove, which starts deep, at full extrusion capacity, and progressively decreases in capacity to essentially zero, at the trailing portion of said mixing and refining zone. The trailing portion of the two part groove design, connects with the downstream edge of the leading portion, by means of the shallow opening as formed by the leading end of the groove or channel, from where the process material is directed in a circumferential direction, along the channel, which progressively diminishes in depth to a minimum depth restrictive opening or openings which, retard the flow of oversize and less fluent process material, and direct the fine and fluent process material to numerous ports commuting between leading in a radial direction to a concentric bore of the rotor member. The concentric bore is provided with a stationary screw-like member, which receives the process material from the numerous ports and by means of an extruder groove configuration, reacts to the rotation of the rotor bore and extrudes the process material out of the end of the extruder.

16 Claims, 4 Drawing Sheets

EXTRUSION APPARATUS

FIELD OF THE INVENTION

This invention relates to an extrusion apparatus, more particularly to an apparatus of the rotor and barrel type for warming, masticating, refining and extruding thermoplastic and rubber like process materials.

BACKGROUND OF THE INVENTION

The rubber and plastic industries have used and are still using extrusion apparatus with screw configurations consisting of helical extrusion grooves. The geometry of the helical groove exposes the process material, at the barrel and rotor extrusion groove surfaces, to high sheer and localized warming of the process material, which develops a flow pattern in the helical extrusion groove, consisting of a warmed outer layer of process material surrounding a cold core of process material. This formation requires downstream corrective action resulting in devices such as, various plow like devices, barrel to screw transfer as used in the Transfermix apparatus, pin-type obstructions in the rotor grooves and most often, increased length of the extruder, to develop the so called dwell time to allow the temperatures to equalize. This temperature stratification is more pronounced in the larger diameter extruders and has hindered the development of more economical large extrusion units.

Also, the extruders in use today, using helical groove rotors, have at their discharge ends the problem of changing from extrusion flow to plug flow, as required for extrusion uniformity. Extrusion flow, leaving the rotor end, is discharged in a circular path as a rotor turns, which causes a pulsing extrusion. Again corrective action must be provided. Special extrusion heads, with large volumn so as to provide dwell time to relax material flow lines, various type barriers arranged to rework the material flow lines, one or two roll extrusion dies, etc. are provided to process the extrusion material to the acceptable low stress plastic state.

SUMMARY OF THE INVENTION

It is therefore a feature of the present invention to provide an extrusion apparatus which, uniformily warms and extrudes the process material, with the input work approximately equal to the work required to raise the process material to the desired temperature.

Another feature is to provide an extrusion apparatus which, accomplishes uniform warming and extrusion of the process material with minimum rework of already worked material.

Still another feature is to provide an extrusion apparatus which, is relatively short in length and thereby less costly to manufacture.

A further feature is to provide an extrusion apparatus which can be operated at high speed, thereby increasing the capacity of the extruder and decreasing the unit cost of extrusion.

A still further feature is to provide an extrusion apparatus which has a constant extrusion temperature regardless of extrusion speed.

Another feature is to provide an extrusion apparatus which mixes and refines all of the process material by passing it through a thin, extended, actuated orifice, sized to retard the flow of oversize material.

Still another feature is to provide an extrusion apparatus which, has an elongated rotor barrier essentially in a circumferential direction, in a zig-zag pattern, which, due to relative rotation rotor to barrel bore, cross shears the process material.

A further feature is to provide an extrusion apparatus which, is provided with a rotor barrier which is extremely long, thereby permitting minimum clearance barrier top to barrel bore.

A still further feature is to provide an extrusion apparatus which orients the material flow lines in a radial direction as it is forced through rotor ports and presents the process material at right angles to the discharge apparatus.

Finally, another feature is to provide an extrusion apparatus which, has a stationary screw-like member, installed in the downstream end of the rotor, which due to the rotor rotation extrudes the process material from the end of the extruder.

DESCRIPTION OF THE PREFERRED EMBODIMENT

Forcing Zone

Figures 1, 15:
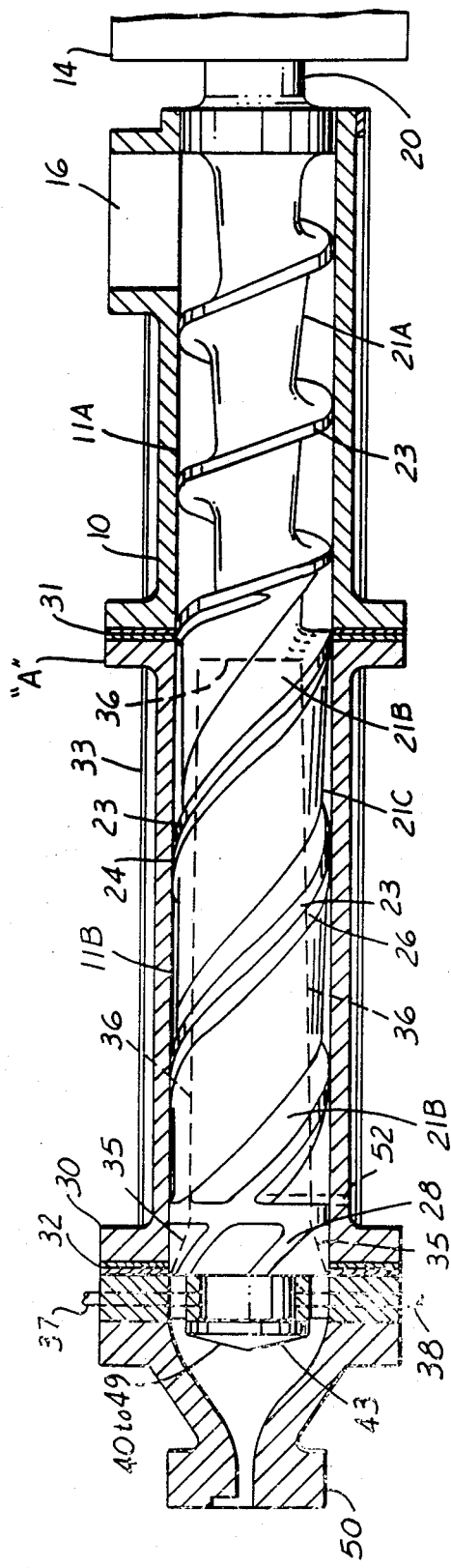
FIG. 1 is a longitudinal sectional view of the extruder apparatus constructed in accordance with the present invention as applied to the processing of thermoplastics and hot or cold fed rubber-like materials.
FIG. 15 is an elevational view of the refining zone of the apparatus.

The process material from the hopper enters the forcing zone via a helical rotor groove, which is provided with a high volumn per turn design in order to have a relatively high extrusion capacity. The helical rotor groove is provided with a tapered bottom, with the shallow end upstream, a design which creates a rotor core, spiral in cross-section, and which compresses the process material, between the groove bottom and the barrel bore, as the rotor is rotated, and thereby achieves early development of heat and extrusion pressure. The process material now warmed and under pressure is transported downstream to the mixing and refining zone.

Mixing and Refining Zone

The design of an extruder limits the flow of process material to a fixed path through the extruder as formed by the groove configuration of the rotor reacting with the barrel bore. For best extruder design, the groove configuration should be one that accomplishes the required shearing and elongation of the process material in the fewest possible moves and thereby the least work input. Two areas for more efficient mixing are; exposing the process material to the extrusion shear with its material flow lines at right angles to the imposed shearing, thereby theoretically shearing the flow lines into areas, and, providing a flow pattern where the flow of process material is accelerated downstream so as to avoid rework of already worked material and to thereby expose the unworked process material to extruder shear.

To provide the best groove configuration for material processing in the mixing and refining zone, the continuation of the helical groove of the forcing zone is changed to a two part, high lead helical or longitudinal groove, the leading portion of which consists of a deep and relatively narrow helical groove, which at extruder capacity, progressively decreases, in a downstream direction to near zero capacity at the end of the zone. The remaining portion, and larger part of the high lead helical or longitudinal groove consists of a shallow groove, parallel to the leading portion, and which starts relatively deep and communicates with the trailing edge of the deep leading edge groove, proceeds circumferentially downstream around the rotor, progressively decreasing in depth so as to become restrictive at its trailing edge. Reaction of the process material to the barrel bore, moves the outer layer of process material downstream and orients the material flow lines in a circumferential direction. At the downstream edge of the groove a funneling type groove receives the process material, rolls it into a tight spiral and directs it to the port leading to the core of the rotor, forcing the spirally oriented flow lines through an orifice, reshearing the flow lines to a radial direction.

One variation of this design is similar, but to assure circumferential flow across the wide shallow groove, circumferential vanes are provided to sectionalize the flow to each discharge port.

Another variation, where refining of the process material is the process required, is to provide the trailing portion of the high lead helical or longitudinal groove with alternate circumferential receiving and sending grooves. The receiving grooves starting deep at the trailing edge of the deep helical groove, progressively decreasing in depth to zero and the sending grooves starting at zero and progressively increasing in depth to maximum at the trailing edge of the trailing portion of the high lead helical or longitudinal groove. The tooth tops, forming these grooves, have their clearance tooth top to barrel bore, set to retard the flow of oversize and less fluent process material, and thereby selectively work and rework the process material requiring additional processing. The zig zag pattern of tooth tops, as developed by the receiving and sending grooves, increases the length of the restrictive clearance to eight times the length of the helical restrictive clearance and therefore can be set to one eighth of the depth required by the helical design.

The zig zag design has the restrictive clearances in a near circumferential direction, so that passing through the clearance is intensively cross-sheared by reaction with to barrel bore. The high shear rate thus developed could in some instances achieve micro-dispersion and thereby improve the quality of the process material.

Stationary Extrusion Rotor

The concentric rotor bore is provided with a stationary rotor-like member, provided with a helical extrusion groove and reacts with the rotating bore to pressurize and transport downstream, the process material entering the rotor bore through the numerous radial ports, from the trailing edge of the high lead rotor grooves. Again, the shearing action is to cross-shear the flow lines of the process material flowing from the ports of the rotor member. The extrusion from a stationary rotor type member is a straight line flow as compared to rotating, pulsing flow from the end of a rotating extruder rotor.

Adjustment of Capacity

As the clearance of the refining groove top clearances to the barrel bore is critical for refining the process material, the rotor outside diameter and the coacting barrel bore are tapered in diameter, with the small end upstream and the large end downstream. Endwise adjustment of the rotor to barrel also adjusts the clearance rotor tooth tops to barrel bore. The clearance of the restrictive tooth tops can be set by changing the height of the teeth forming the high lead helical groove, either by grinding or applying hard surfacing metal.

Temperature Control

The primary control of the process material extrusion temperature is the length of the extruder, to thereby adjust the input work to the temperature rise of the process material. However, the adjustable clearance of the restrictive tooth tops of the mixing and refining zone can also adjust extrusion capacity and thereby change the extrusion temperature. Cooling jackets and rotor cooling do little for control of extrusion by heat exchange, however the effect of extruder temperature on the coefficient of friction of the process to the extruder surfaces is important to temperature control.

DESCRIPTION OF EXTRUSION APPARATUS

Referring now to the drawings, the extrusion apparatus "A" of FIG. 1 is applied to the processing of natural and synthetic rubber-like materials, hot or cold fed, and also to many thermoplastic materials. The extrusion apparatus A has a barrel member 10 and 30, each provided with a cylindrical bore 11A and 11B extending therethrough, which acts in combination with rotor or rotor member 20, rotatably mounted therein. The rotor member 20 is adapted to be rotated by drive means 14, as is conventional in the art.

The barrel member 10 is provided at the feed end thereof, with a hopper opening 16 in the top thereof, or in the side thereof, and remote from the discharge end of the extruder 41.

The upstream end, or forcing zone, of rotor 20 is provided with a single start helical groove 21A, which has a lead equal to approximately to one diameter of the rotor and which, when filled with process material from hopper opening 16 and rotated relative to the barrel 10, by drive means 14, causes the process material to be extruded forward, along helical groove 21A to helical grooves 21B and 21C, as formed between ridges or teeth 23 of the mixing and refining zone. Groove 21B is a deep helical groove with a lead in the range of two diameters, to a longitudinal groove of infinite lead. Groove 21B starts at extruder capacity and progressively decreases in extrusion capacity to near zero at the rotor discharge end. Groove 21C, two or more times as wide as 21B, extending the length of the mixing refining zone, and parallel to 21B, with its leading edge common to and commuting with the trailing edge of 21B. The leading edge of 21C is deep and progressively decreases in depth to its downstream edge to minimum depth 24. Thus, a tapered depth or wedge shaped channel is formed, which, due to relative rotation rotor 20 to barrel bore 11B, develops high pressure and shear in the process material adjacent to the barrel bore 11B. This process material traversing groove 21C, in a circumferential direction, becomes warm and fluent and when reaching the downstream edge of 21C, is funneled radially inward, through numerous ports, provided in rotor 20, to the rotor core bore 36. The wedge shaped channel, as formed between rotor groove 21C and barrel bore 11B accomplishes the following:

(A) The funneling off of the warmed process material permits the depth of the wedge shaped channel and groove 21C to be significantly reduced, and thereby increasing the shear rate applied to the process material, to the extent that a length, equal to half a turn, generates the same shear as three or four turns of a rotor having normal groove depth.

(B) The funneling off of the warmed process material reduces the rework of already worked process material, and thereby saves power input and permits higher rotor speeds and the resulting increased capacity, without exceeding the specified temperature of the extrusion.

(C) The elimination, of the formation of a cold core of process material is surrounded by a fluent layer of process material.

(D) A rotor groove 21C design performs most of the required working of the process material in one pass, and is arranged that all process material receives one pass and one pass only.

(E) The orienting of process material flow lines in a circumferential direction is provided so as to be cross-sheared in subsequent extruder action.

The rotor core bore 36 is provided with a stationary screw-like member 40 to 49, which cross-shears the process material arriving from the numerous ports 29 or rotor 20 and transports it downstream to be extruded from the end of the extruder. As the screw-like member 40 is stationary, the extrusion is free of "blips" caused by the rotating end of the rotor in normal extrusion.

Figure 2:
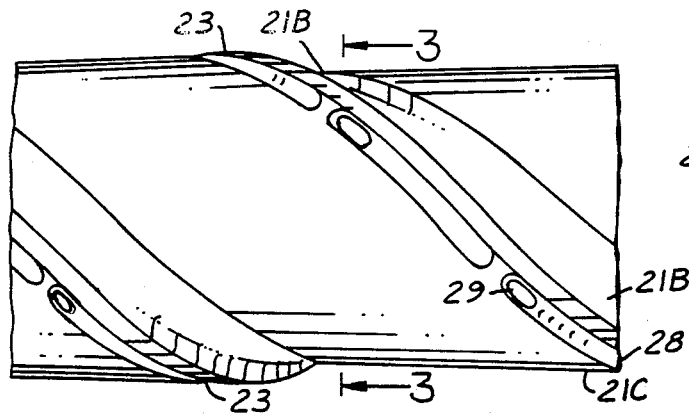
FIG. 2 is an enlarged elevational view of the rotor of the mixing and refining zone.

The rotor 20 is the mixing and refining zone as shown in FIG. 2 has a groove (or grooves) 21B as a two start helical groove with a diameter lead, and groove (or grooves) 21C with a smooth surface in the form of a tightening spiral, both of which are interposed between ridges or teeth 23.

Figure 3:
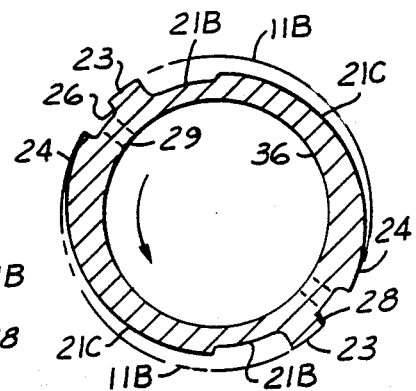
FIG. 3 is a sectional view taken on the line 3—3 of FIG. 2.

The rotor 20 as shown in FIG. 3 has two start grooves 21B and two start grooves 21C interposed between ridges or teeth 23. Groove 21C starts deep at 21B and progressively decreases in depth to the downstream end 26 of groove 21C. Minimum clearance of groove 21C to barrel bore is shown as 24. Port 29 is the funnel arrangement which directs the processed process material, from 21C to the core bore 36 of rotor 20.

Figure 4:
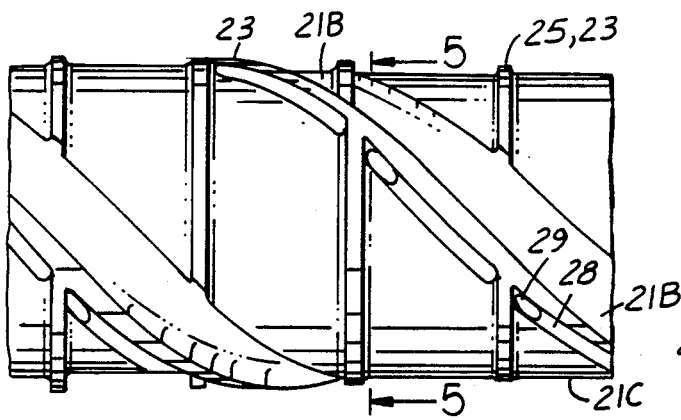
FIG. 4 is an enlarged elevational view of another embodiment of the rotor of the mixing and refining zone.
Figure 5:
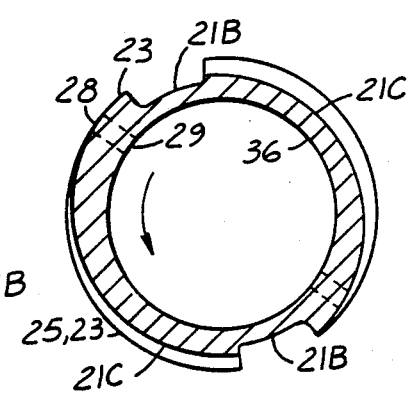
FIG. 5 is a sectional view taken on the line 5—5 of FIG. 4.

An alternate design of the rotor 20 of the mixing and refining zone is shown in FIGS. 4 and 5. It is similar to FIG. 2 except that circumferential ridges 25 have been added to groove 21C. The circumferential ridges are the same height as teeth 23 and divide groove 21C into sections, each of which has an inlet at 21B, and an outlet 28 and 29 at the trailing edge of 21C. FIG. 5 is similar to FIG. 3 except for the circumferential ridges 25.

Figure 6:
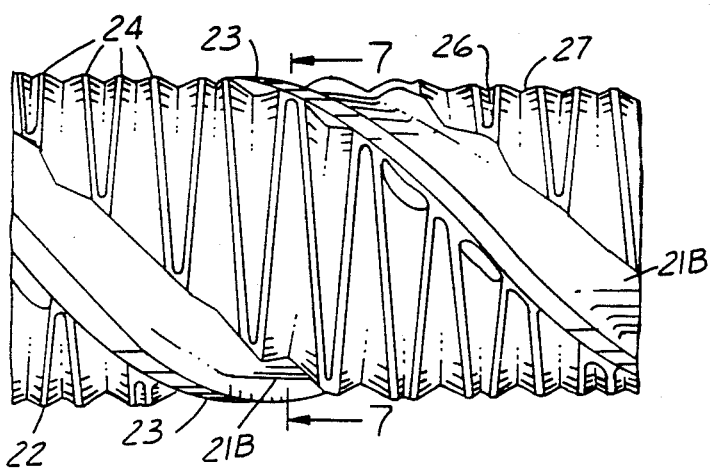
FIG. 6 is an enlarged elevational view of still another embodiment of the rotor of the mixing and refining zone.
Figure 7:
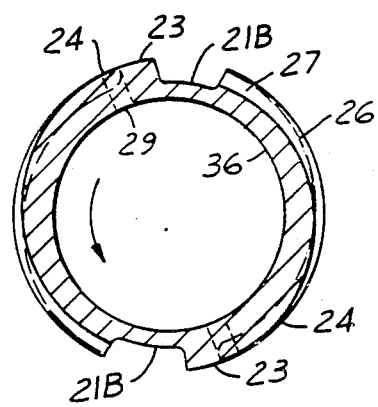
FIG. 7 is a sectional view taken on the line 7—7 of FIG. 6.

Another alternate design of rotor, particularly for process materials in need of refining is shown in FIG. 6 and in FIG. 7. To refine process material, it is necessary to provide openings which are restrictive in depth so as to retard the flow of oversize and less fluent process material. To achieve the required depth, length has to be increased to maintain extrusion capacity. This length increase is achieved by providing two sets on circumferential grooves 26 and 27. Groove 27 starts at full capacity at the trailing edge of groove 21B, extends circumferentially downstream, progressively diminishing in capacity to near zero at its trailing end. Groove 26 starts at zero capacity near the trailing edge of groove 21B, extends circumferentially downstream, progressively increasing in capacity to full capacity at its trailing end.

The aforementioned arrangement is such that process material entering groove 27, is conveyed circumferentially downstream, pressurized and forced to flow longitudinally, over the groove forming ridge 24, to circumferential groove 26, which conveys its to its downstream end. This arrangement develops a flow pattern which forces the process material, with its material flow lines at near right angles to the intensive circumferential shear of the ridge tops 24 to barrel bore 11B. This alternate design, develops a ridge top length eight times longer than that of the rotors of FIG. 2 and FIG. 4 and can therefore provide restrictive openings one eighth as deep without reducing extruder capacity. The smaller openings can be expected to improve the micro-dispersion of ingredients in the process material and thereby improving the quality of the product.

As shown in FIG. 7, the rotor has groove 27 starting deep at the trailing edge of groove 21B extending circumferentially downstream and ending at zero depth at its downstream end at ridge or tooth 23. Groove 26, shown as a dashed line, starts at zero depth at the trailing edge of groove 21B extends circumferentially downstream to maximum depth at its downstream end. Grove 26 at its downstream end is provided with a port 29 which funnels the process material from rotor groove 26, radially inward to the core bore 36 of rotor 20.

Figure 8:
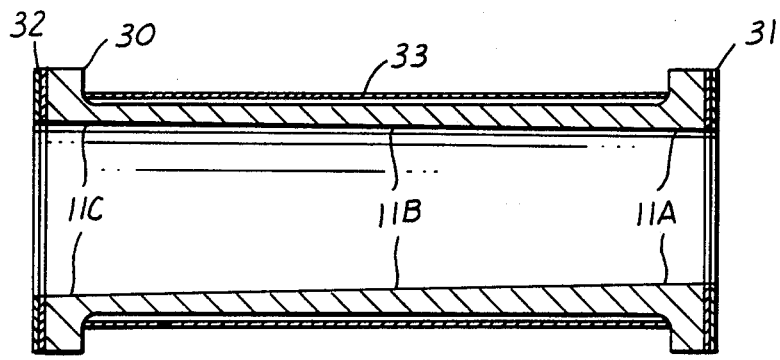
FIG. 8 is a longitudinal cross-sectional view of the barrel member of the mixing and refining zone.

The mixing and refining zone barrel member 30 of FIG. 8 has a bore 11B, as starting small at 11A of the forcing zone and tapering to a larger bore 11C at the downstream end of the zone. This arrangement provides for the adjustment of the clearance between the barrel bore 11B and the outside diameter of rotor 20 groove teeth 23. The end adjustment can be made by means of shims 31 and 32 or other suitable means. The coolant jacket 33 is for fluid temperature control of the mixing and refining zone.

Figure 9:
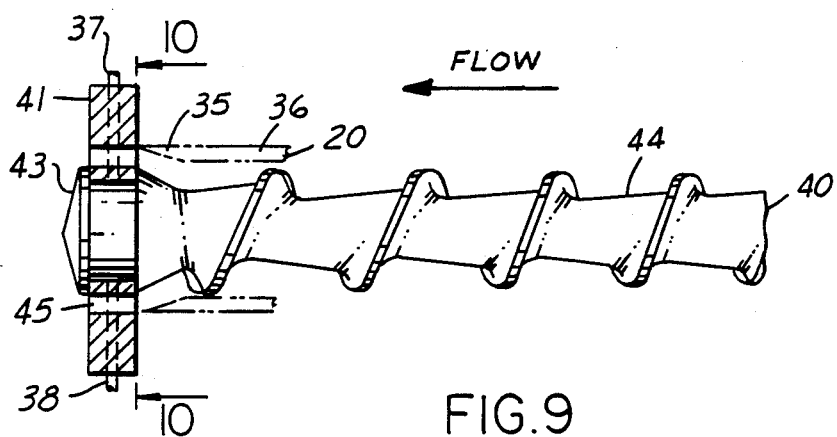
FIG. 9 is an elevational view of the stationary screw-like, extrusion discharge member, partly in cross-section.
Figure 10:
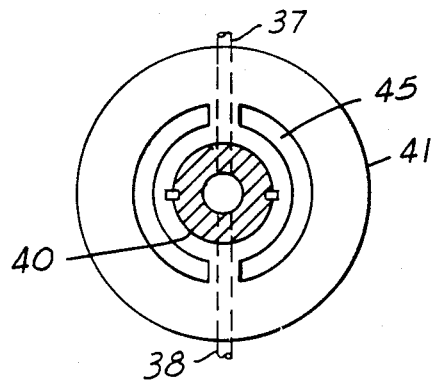
FIG. 10 is an elevational view of the end supporting plate taken on the line 10—10 of FIG. 9.

The stationary screw-like member 40 of FIGS. 9 and 10 is installed in the bore 36 of rotor 20, of the mixing and refining zone. It is shown with a single start helical extruder groove 44 which is activated by the rotating bore 36 of rotor 20. It is rigidly mounted in bore 36 by mounting plate 41 and end cap 43 and has openings 45 for the process material to leave the extruder. Cooling pipes 37 and 38 connect to screw-like member 40 for temperature control. The relative locations of openings 45 and cooling supply and return pipes 37 and 38 is illustrated in FIG. 10.

Figure 11:
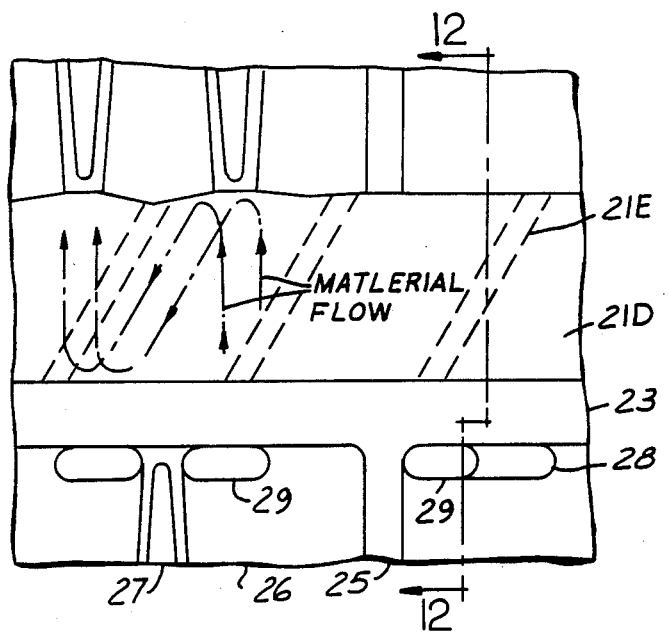
FIG. 11 is an enlarged fragmentary view of the longitudinal groove of the mixing and refining zone.
Figure 12:
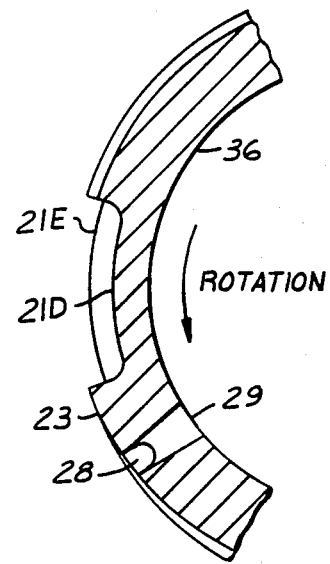
FIG. 12 is a cross-sectional view taken on the line 12—12 of FIG. 11.

The rotor of the mixing and refining zone, of FIGS. 11 and 12, shows in detail the continuation of groove 21A of the forcing zone, as multiple longitudinal grooves 21D, which are provided with submerged angular barriers 21E, which direct the submerged cross-groove extrusion return flow in a downstream direction.

Figure 13:
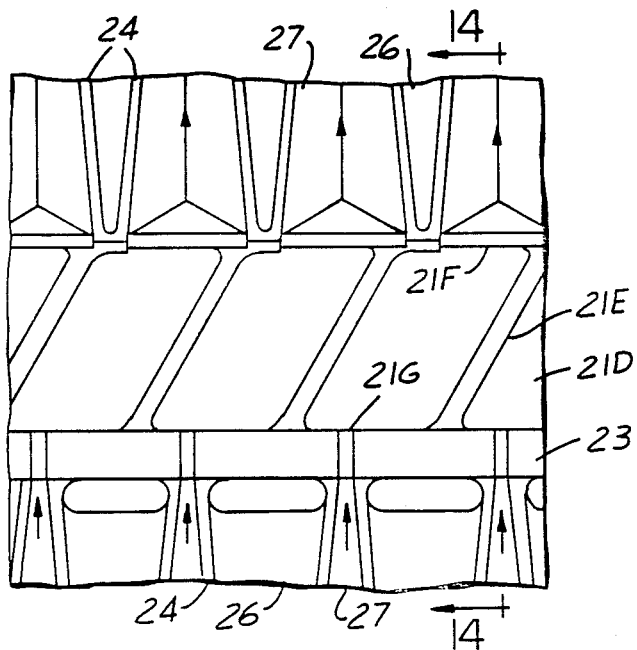
FIG. 13 is a fragmentary view of the high lead or longitudinal groove of the refining, straining section, arranged to distribute the process material to multiple circumferential refining grooves.

In FIG. 13 the longitudinal groove 21D of the refining section is arranged to refine and separate the fine and fluent from the oversize and less fluent process material. The first separation is accomplished by barrier 21F, which has a clearance barrier top to barrel bore 11B, designed to block the passage of grossly oversize material from entering the circumferential grooves 27. The second separation is performed by the tooth tops 24, which have a clearance barrier top 24 to barrel bore 11B designed to pass only the desired fine and fluent process material, from the circumferential groove 27 to circumferential groove 26. Material not passed over the barriers 24, proceeds circumferentially downstream to opening 21G at the leading edge of longitudinal groove 21D. Tooth and barrier tops 23 and 24 can be of the same height where rotor 20 concentric alignment is accomplished by other means. This arrangement permits the adjustment of the restrictive tooth top clearance by endwise movement of the rotor 20. The oversize and less fluent process material, flowing in longitudinal groove 21D reaches the end of the straining section and is discharged from the extruder through discharge ports 52 (FIG. 1) in barrel member 10, which are arranged to discharge the material at a preset rate. The fine and fluent material, passing over the barriers 24, from circumferential groove 27 to circumferential groove 26, proceeds downstream along groove 26 to rotor discharge port 29, which directs the material to rotor bore 36. Barriers 21E, located in longitudinal groove 21D, direct the submerged cross groove flow of process material in a downstream direction to assist longitudinal flow in groove 21D.

Figure 14:
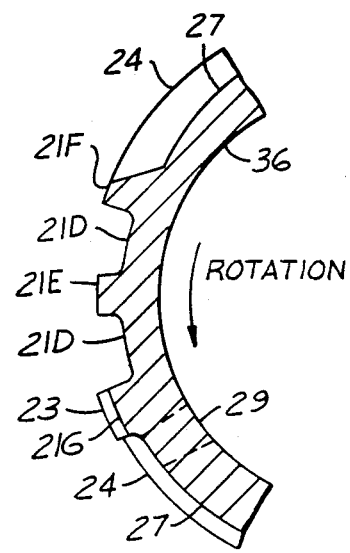
FIG. 14 is a sectional view of FIG. 13 showing the relative heights of the rotor tooth tops and barrier heights.

FIG. 14 illustrates the relative heights of tooth top 23, barriers 21F and barriers 24. The tapering depth of circumferential groove 27 is also indicated.

The refining extrusion of the rotor of the mixing and refining zone is shown in FIG. 15 and includes the following features:

1. Mainstream extrusion flow is longitudinal, and feeds closed end circumferential grooves.
2. Partial extrusion circumferential flow, closed outlets.
3. Normal extrusion clearance at longitudinal tooth tops.
4. Restrictive tooth top clearance greatly increased in length.
5. Auxiliary take-away channel.
6. Auxiliary take-away channel radial ports at downstream end.
7. Concentric rotor end bore with take-away screw.
8. No Dross overflow device.

What I claim is:

1. An extrusion apparatus for the mixing and refining of rubber-like materials, either hot or cold feed, and some thermoplastic materials which comprises: an elongated cylindrical barrel member, an elongated rotor member, disposed coaxially in the interior of said barrel member and having an upstream and a downstream end, said rotor member provided with a concentric bore, at said downstream end in which a stationary screw-like member is coaxially disposed; means for relative rotational movement of said rotor member with respect to said barrel member and to said stationary screw-like member, for treating and axially advancing a process material; said barrel, rotor and screw-like members defining a feed end, a forcing zone, a mixing and refining zone, and a discharge end, interposed between said barrel ends; said rotor member being proven in said forcing zone with one or more extrusion grooves, capable of warming, pressurizing and transporting the process material to said mixing and refining zone, said rotor groove being a continuation of said forcing zone and being provided with a two part groove design, the leading portion of which consists of a deep, high lead, or longitudinal extrusion groove, which starts deep, at full extrusion capacity, and progressively decreases in capacity to essentially zero, at the trailing portion of said mixing and refining zone the trailing portion of said two part groove design connects with the downstream edge of said leading portion, by means of the shallow opening formed by the leading end of the groove the process material being directed in a circumferential direction, along the groove, which progressively diminishes in depth to a minimum depth restrictive opening or openings which retard the flow of oversize and less fluent process material, and direct the fine and fluent process material to ports leading radially inwardly to said concentric bore of said rotor member; said stationary screw-like member receives the process material from said ports and by means of an extruder groove configuration, reacting to the rotation of the rotor core bore, extrudes the process material out of said discharge end of the extruder.

2. An extrusion apparatus as defined in claim 1, in which said rotor of the forcing zone consists of one or more helical grooves which have a tapered groove bottom which forms the rotor core into a tightening spiral shape when viewed in cross-section.

3. An extrusion apparatus as defined in claim 1, in which said rotor member of the forcing zone is provided with multiple extrusion grooves.

4. An extrusion apparatus as defined in claim 1, in said rotor and barrel bore increase in diameter in a downstream direction so as to make the clearance rotor to barrel adjustable by endwise positioning of the rotor to barrel.

5. An extrusion apparatus as defined in claim 1, in which said leading portion of the groove of the mixing and refining zone is provided with a tapered bottom groove.

6. An extrusion apparatus as defined in claim 1, in which said trailing portion of the groove of the mixing and refining zone, provides a circumferential flow channel which starts deep and progressively decreases in depth to a restrictive ridge-like outlet, over which all process material must pass.

7. An extrusion apparatus as defined in claim 1, in which said trailing portion of said two part groove design is provided with circumferential vanes which limit the flow of the process material to a circumferential path.

8. An extrusion apparatus as defined in claim 1, in which said trailing portion of said two part groove is fitted with alternate circumferential channels arranged to provide a zig-zag restrictive ridge of maximum length and thereby permitting minimum depth of the restrictive openings without restricting the extrusion capacity.

9. An extrusion apparatus as defined in claim 1, in which said trailing portion of said two part groove design has restrictive openings in a circumferential direction so as to cross-shear the process material flowing through the openings.

10. An extrusion apparatus for the mixing and refining of rubber-like materials, either hot or cold feed, and some thermoplastic materials, said apparatus having a cylinder with a discharge port, a rotor with an upstream and downstream end being rotatably mounted in the bore of said cylinder, and having a stationary screw-like member mounted in a concentric bore of the downstream end of said rotor and operable to move said process material from one end of said cylinder to the other, to progressively warm, mix and refine said process material to a fine and fluent phase, for extrusion from an extrusion head adapted to form the desired product; said rotor having at least a forcing zone and a mixing and refining zone, first means, structurally integral with said forcing zone; for operably exerting continuous pressure and moving the process material downstream to said mixing and refining zone; second means, structurally integral with said mixing and refining zone, and operable for moving the process material longitudinally downstream the length of the mixing and refining zone; third means, structurally integral with said mixing and refining zone, for uniformly accepting process material along the length of said mixing and refining zone, from said second means and directing it circumferentially downstream through a tightening wedge shaped channel or channels defined by boundaries, subjecting the process material to intensive shear and developing the outer layer, adjacent to the barrel bore into a warm and fluent phase material, which passing through said boundaries of said wedge shaped channel is continuously separated from the cold and less fluent process material and directed to said concentric bore in a radial direction through ports, continuously separating the warmed and fluent process material, at the end of said channel, thus eliminating the usual submerged cross groove return flow characteristic of normal helical extruder grooves; fourth means, structurally integral with said mixing and refining zone, said ports directing all of the warm and fluent process material from the outer portion of said rotor to said concentric bore, passage through and said ports reorients the process material flow lines and adds a uniform amount of shear to all of the process material; and fifth means, structurally integral with said concentric bore and said mixing and refining zone, for accumulating the fine and fluent process material, passed by said fourth means, pressurizing it and directing it downstream towards and through said discharge port of an extruder head.

11. An extrusion apparatus as defined in claim 10, in which the set of circumferential grooves, which start deep and taper to zero are provided with a restrictive barrier at their lead end and which has a clearance, barrier top to barrier bore which blocks the entrance of grossly oversize process material.

12. An extrusion apparatus as defined in claim 10, in which the sets of circumferential grooves have the same outside diameter as the high lead or longitudinal extrusion groove or grooves.

13. An extrusion apparatus as defined in claim 10, in which the sets of circumferential grooves have a smaller outside diameter as the high lead or longitudinal extrusion groove or grooves.

14. An extrusion apparatus as defined in claim 10, in which endwise movement of the rotor member adjusts the radial clearance of the groove teeth and barrier tops to the barrel bore.

15. An extrusion apparatus as defined in claim 10, in which the set of circumferential grooves, starting deep and tapering to zero depth have at their trailing end, a small passage which communicates with the said high lead or longitudinal extruder groove so as to return rejected material back to the mainstream.

16. An extrusion apparatus as defined in claim 10, having at the downstream end of the straining refining section a discharge port in the barrel member arranged to lead off oversize and less fluent process material not passed over the restrictive barriers.

* * * * *